June 30, 1953   A. F. PITYO   2,644,069
APPARATUS FOR CUTTING WIRE AND BUTT
WELDING THE SAME TO AN ELEMENT
Filed April 7, 1952   4 Sheets-Sheet 1

INVENTOR
ALBERT F. PITYO
BY
ATTORNEY

June 30, 1953     A. F. PITYO     2,644,069
APPARATUS FOR CUTTING WIRE AND BUTT
WELDING THE SAME TO AN ELEMENT
Filed April 7, 1952     4 Sheets-Sheet 3

INVENTOR
ALBERT F. PITYO
BY
ATTORNEY

INVENTOR
ALBERT F. PITYO
BY
ATTORNEY

Patented June 30, 1953

2,644,069

UNITED STATES PATENT OFFICE 2,644,069

APPARATUS FOR CUTTING WIRE AND BUTT WELDING THE SAME TO AN ELEMENT

Albert F. Pityo, Clifton, N. J.

Application April 7, 1952, Serial No. 280,914

15 Claims. (Cl. 219—4)

My invention relates to a machine for welding small parts, while not necessarily restricted to this use.

An important object of the invention is to provide a machine of the above-mentioned character which will weld a wire to a companion metal part, and then sever the wire in a suitable length.

A further object of the invention is to provide means for maintaining constant the length of the wire projecting beyond the electrode means so that the resistance of this wire length is maintained constant, which is frequently critical.

A further object of the invention is to provide a machine having the wire gripping means and the wire severing means mounted upon a common slide or carriage, so that the length of the wire projecting beyond the electrode means remains constant although the stroke of the slide may vary slightly.

A further object of the invention is to provide means to positively stop the down stroke of the slide or carriage during the continuous operation of the driving means for the slide, to provide a dwell for the slide at the down position.

A further object of the invention is to provide means to move the companion metal part into welding contact with the wire during the dwell of the slide and wire, to avoid injury or bending of the parts to be welded, and to effect the welding during the dwell of the wire.

A further object of the invention is to provide a machine having means to properly grip the wire to prevent possible slippage without injury to the wire.

A further object of the invention is to provide a machine of the above-mentioned character which is automatic in operation and lends itself to butt welding.

Other objects and advantages of the invention will be apparent during the course of the following description.

In the accompanying drawings forming a part of this application and in which like numerals are employed to designate like parts throughout same.

In the drawings, where for the purpose of illustration is shown a preferred embodiment of my invention, a support is shown comprising a flat vertical plate 10, rigidly secured to a horizontal base or foot 11 which in turn is rigidly mounted upon a bench or like support. Most of the operating parts of the machine are mounted upon the vertical plate or support 10.

Figure 2:
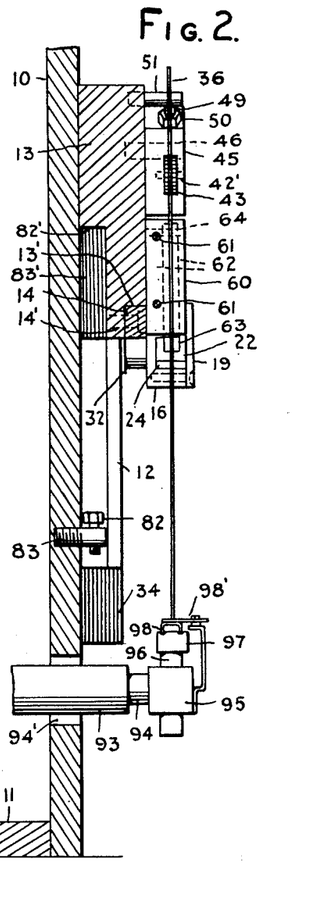
Figure 2 is a vertical section taken on line 2—2 of Figure 1, looking to the right.
Figure 3:
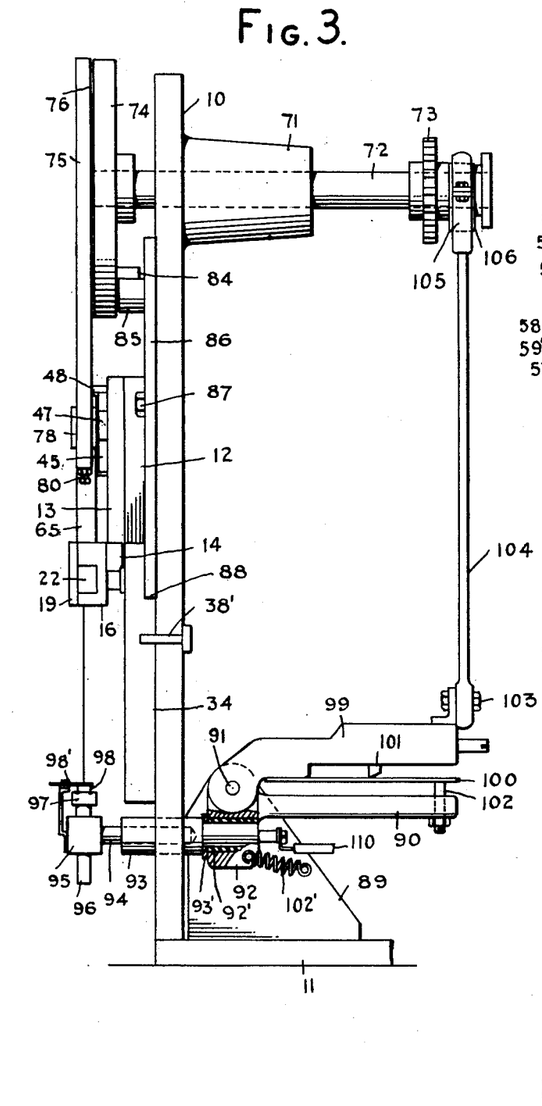
Figure 3 is an edge elevation of the machine.
Figure 4:
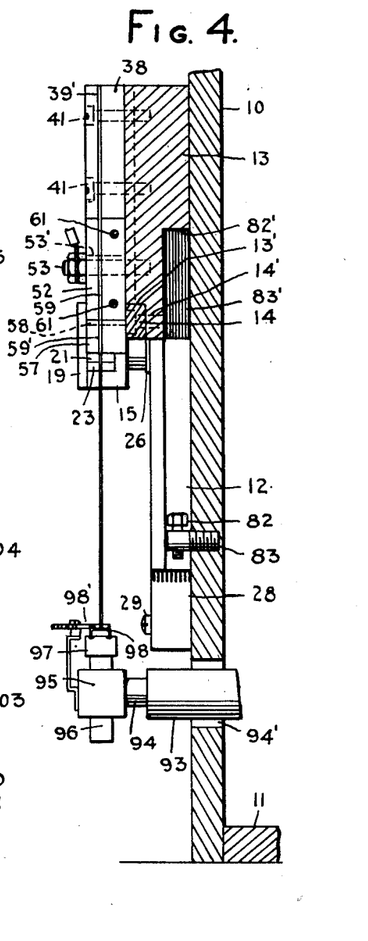
Figure 4 is a vertical section taken on line 2—2 of Figure 1, looking to the left.

Rigidly mounted upon the vertical plate 10 are vertical parallel guides 12, held in place by screws or the like. Mounted to reciprocate between the guides 12 is a vertical slide 13, and a horizontal bar 14 is rigidly secured to the lower end of the slide 13. As more clearly shown in Figures 2 and 4, the slide 13 has a recess 13' to receive the bar 14 and the bar is attached to the slide by screws 14' or the like.

Figure 1:
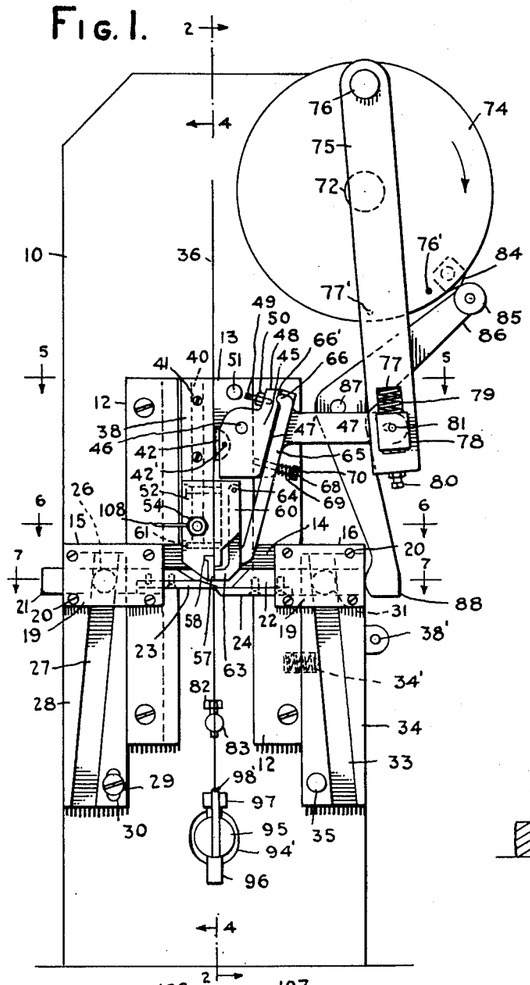
Figure 1 is a front elevation of a welding machine embodying my invention.

The bar 14 is provided with blocks 15 and 16, rigidly secured to the bar and arranged upon the outer face of the bar 14. These blocks are rigidly secured to the bar 14 by screws 15'. The blocks may be formed integral with the bar 14, and these blocks are horizontal and are provided upon their front faces with horizontal grooves 17 and 18, and these grooves are covered by plates 19, held in place by screws 20. Mounted to reciprocate within the grooves 17 and 18 are blade carriers 21 and 22. The blade carrier 21, see more particularly Figures 1 and 8, has an upper horizontal blade 23 detachably and rigidly secured thereto by screws 23' and the blade carrier 22 has a lower horizontal blade 24, rigidly and detachably secured thereto by screws 24'. These blades are arranged so that their blades produce a shearing action, to sever a wire, to be described. The blade carrier 21 has a stud 25 rigidly secured thereto and this stud carries a roller 26, operating in a vertically inclined cam groove 27 formed in a vertical cam bar 28. The stud 25 carries a spacing sleeve 26'. The cam bar 28 is disposed adjacent to the outer edge of the guide 12 and is secured to the vertical plate 10 by screws 29 tapped into the plate 10 and extending through the elongated vertical slots 30 to permit a vertical adjustment of the cam bar 28 and to clamp the cam bar in the selected adjusted position. The stud 25 operates within an elongated horizontal slot 30' formed in the block 15. The carrier 22 has a stud 31 rigidly secured thereto and this stud carries a roller 32, operating within a cam groove 33 which is vertically inclined and formed upon a substantially vertical cam bar 34. This cam bar is disposed adjacent to the companion guide 12 and is pivotally mounted at its lower end upon the vertical plate 10 by a pin 35. The stud 31 has a spacing sleeve 35' and operates in a horizontal slot 36' formed in the block 16. Before the wire is severed, the cam bar 34 is slightly vertical inclined from the guide 12 and is held in this inclined position by a spring 34' which will press the cam bar 34 against a stationary stop 38'. The cam bar 34 is therefore slightly spaced from the guide 12 and is held in this spaced position by the spring 34' until the cam bar is positively swung inwardly, to sever the wire, as will be described. It is thus seen that the cam grooves 27 and 33 are vertically inclined and converge upwardly, and when the blocks 15 and 16 move upwardly, the grooves 27 and 33 will cause the blades 23 and 24 to move inwardly, preparatory to the shearing action. Since the cam groove 27 of the cam bar 28 is vertically inclined, by vertically adjusting the cam bar 28, the blade 23 may be accurately adjusted with respect to the wire to be cut. The blade 23 should contact with the wire only when the block 15 is at the end of its top stroke. Since the cam bar 34 is slightly vertically inclined, the blade 24 is farther from the wire than the blade 23, and remains spaced from the wire a short distance, until the block 16 reaches the top of its stroke, at which time cam bar 34 is swung inwardly and the blade 24 will be shifted inwardly for coaction with the blade 23 to sever the wire. When the slide 13 and blocks 15 and 16 move downwardly, the cam bar 34 is released and is shifted to the outer position, and the cam grooves 27 and 33 acting upon the rollers 26 and 32 will shift the blades 23 and 24 outwardly, so that these blades will not contact with the wire during the downward movement.

Figure 5:
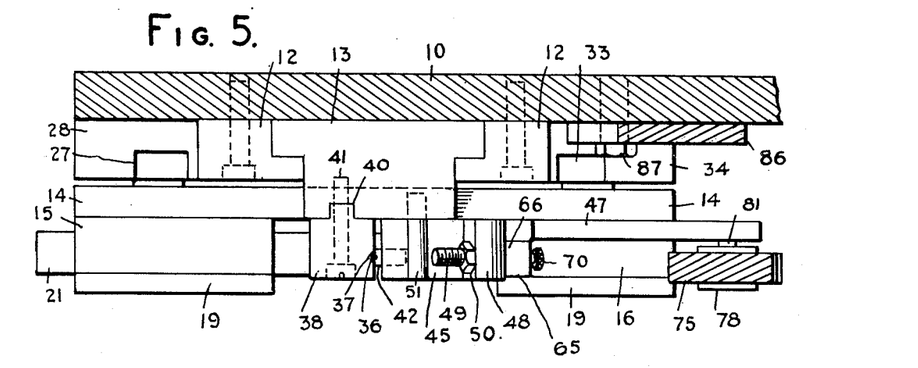
Figure 5 is a horizontal section taken on line 5—5 of Figure 1.
Figure 8:
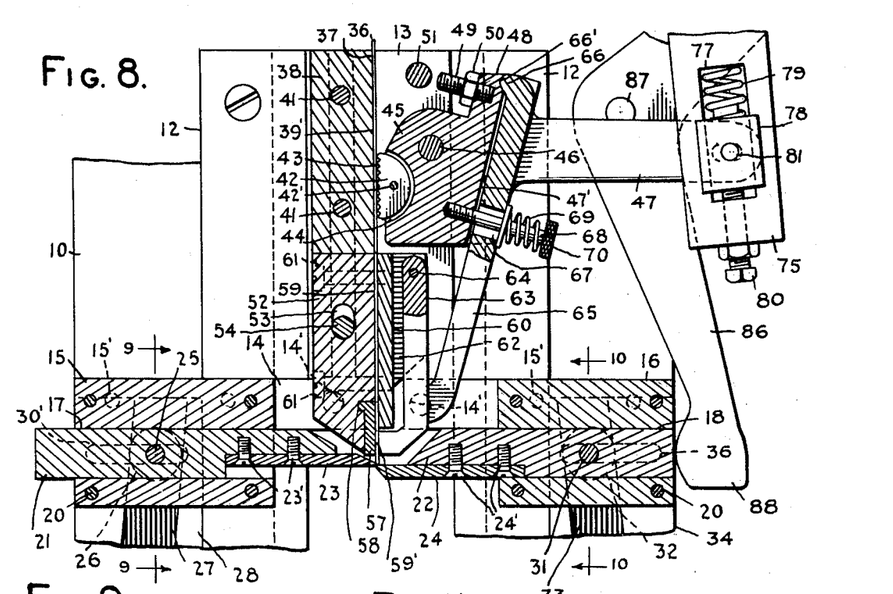
Figure 8 is a vertical section taken on line 8—8 of Figure 3.

The numeral 36 designates a wire to be welded to the work or companion element and severed when the slide reaches the end of its up stroke. This wire is fed vertically downwardly from a source of wire such as a spool and is passed over the face 37 of a vertical clamp block 38, having a tongue 39 arranged within a vertical groove 40, Figure 5, formed in the slide 13. This block 38 is clamped to the slide by set screws 41. Arranged in opposition to the vertical face 37, see more particularly Figure 8, is a clamp jaw 42, having serrations 43, to positively grip the wire and clamp the wire against the clamp block 38 so that the wire cannot slip with respect to the elements 38 and 42, when these elements move downwardly. The clamp jaw 42 is mounted within a recess 44 formed in a head 45, which is pivoted to the slide 13 by a pin 46, to swing in a vertical plane. The clamp block 38 has a vertical guide groove 39', to receive the wire 36, and this groove is less than one half of the diameter of the wire so that the wire will project beyond the groove to be properly engaged by the clamp jaw 42. The clamp jaw 42 is pivoted to the head 45 by a pin 42'.

Figures 9, 11:
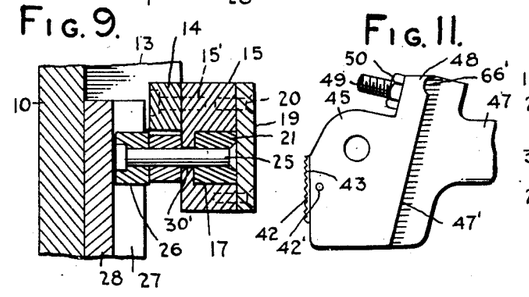
Figure 9 is a transverse vertical section taken on line 9—9 of Figure 8.
Figure 11 is a side elevation of a pivoted head, parts broken away.
Figures 10, 15:
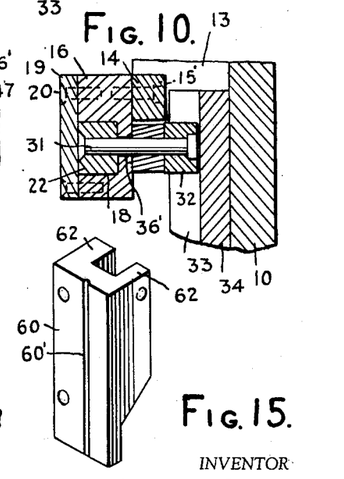
Figure 10 is a similar view taken on line 10—10 of Figure 8.
Figure 15 is a perspective view of a companion electrode holder, and, Figure 16 is a diagrammatic view of a welding circuit.
Figures 12, 13, 14:
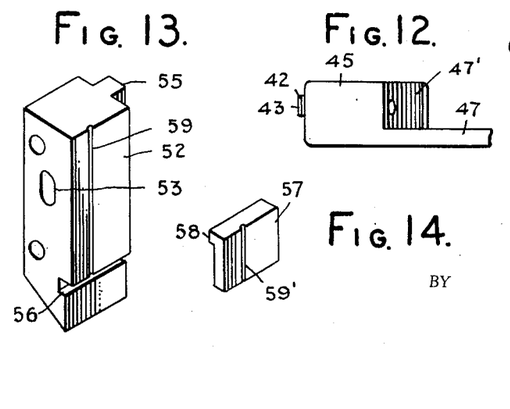
Figure 12 is a plan view of the pivoted head.
Figure 13 is a perspective view of an electrode holder.
Figure 14 is a perspective view of the electrode carried by the holder.

The head 45 has an arm 47 rigidly secured thereto and extending generally horizontally. The head 45 forms with the arm 47 a shoulder 47', Figures 11 and 12. The head 45 is provided with an upwardly projecting extension 48, having a stop bolt 49 tapped therein and adjustable with relation thereto and held in the selected adjusted position by a lock nut 50. The stop bolt 49 is arranged near a stationary stop 51, which is rigidly mounted upon the slide 13. The function of the bolt 49 and stop 51 is to limit the outward movement of the lower end of the head 45 when the slide is moved upwardly, providing a positive means for raising the slide.

Figure 6:
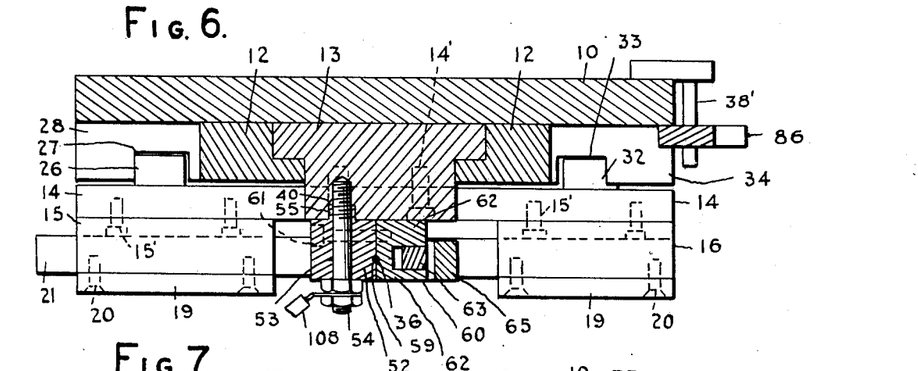
Figure 6 is a similar view taken on line 6—6 of Figure 1.
Figure 7:
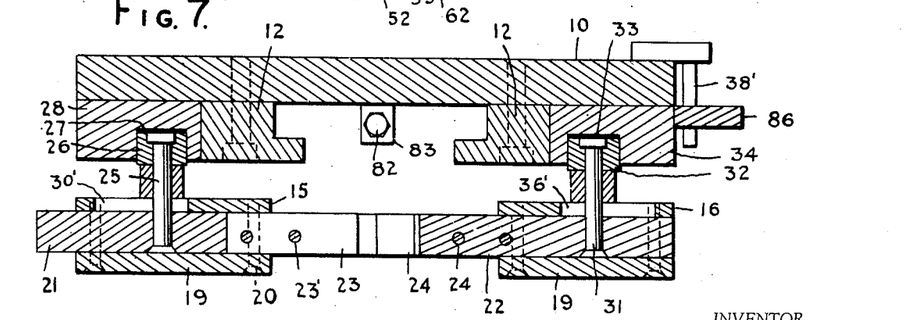
Figure 7 is a similar view taken on line 7—7 of Figure 1.

The numeral 52 designates a vertically adjustable electrode holder having an elongated opening 53 for receiving a bolt 54 to clamp the electrode holder to the slide 13 in the selected adjusted position. This slide has a tongue 55, Figure 6, held within the groove 40 of the slide. The electrode holder 52 is provided at its lower end with a recess 56 to receive an electrode 57, preferably formed of copper and having a horizontal extension 58 to engage in a notch 58', as shown. The electrode holder 52 has a longitudinal groove 59 formed therein, which is continued through the electrode 57, as indicated at 59'. This groove or grooves is slightly less than one half of the diameter of the wire. A companion electrode holder 60 is provided, which is mounted upon the electrode holder 52, and is rigidly detachably connected with the holder 52 by means of screws 61. The electrode holder 60 has spaced flanges 62 formed integral therewith, and a companion L-shaped electrode 63 is arranged between these flanges. This electrode is preferably formed of copper and its lower end is in the form of a flat face which contacts with the wire held within the groove 59'. The upper end of the electrode 63 is pivoted to the flanges 62, by a pin 64. The electrode holder 62 has a longitudinal groove 60', to receive the wire 36 and this groove is slightly larger than one half of the diameter of the wire, the two grooves 59 and 60 forming a cylindrical opening to freely slidably guide the wire without clamping engagement therewith.

The lower end of the pivoted electrode 63 is engaged by an upstanding operating arm 65, disposed adjacent to the shoulder 47', and the lower end of this arm is bent laterally slightly to contact with the lower end of the electrode 63 while its upper end is provided with a rounded head or extension 66, pivotally seated within a recess 66' formed in the extension 48. The operating arm 65 is provided between its ends with a transverse opening 67, slidably receiving a bolt 68, tapped into the lower end of the head 45, and this bolt carries a compressible coil spring 69 engaging the outer side of the arm 65 and engaged by a head 70 of the bolt 68. The spring 69 holds the extension 66 in the recess 66'. It is thus seen that when the head 45 is turned clockwise, Figures 1 and 8, the bolt 68 compresses the spring 69 against the arm 65, and the lower end of this arm swings inwardly, thereby swinging the lower end of the electrode 63 inwardly, so that the two electrodes 63 and 57 have a firm yielding engagement with the wire for effecting a proper electrical contact.

The vertical plate 10 is provided at its upper end with a horizontal bearing 71, receiving a horizontal rotatable shaft 72, driven by a sprocket chain 73 receiving power from any suitable source. The shaft 72 is continuously rotated in operation.

Rigidly mounted upon the shaft 72 is a disc 74, having a link 75 pivoted thereto at 76. This link is provided near its lower end with a longitudinal slot 77, receiving a flanged block 78, slidable therein. The upward movement of this block is opposed by a compressible coil spring 79 and its downward movement is limited by an adjustable stop bolt 80 tapped into the lower end of the link 75 and carrying a lock nut. The block 78 is pivotally connected with the outer end of the lever 47 by a pin 81, operating within an elongated slot in the arm 47. It is thus seen that when the disc turns clockwise, Figure 1, and the pin 76 travels from the high position to the low position, that the arm 47 will be swung downwardly by virtue of the compression of the spring 79. This turns the arm 47 upon the pivot 46 and the clamp jaw 42 grips the wire 36 against the companion clamp block 38. Further downward movement of the pin 76 causes the arm 47 to move the slide 13 downwardly while continuing the clamping engagement with the wire. The wire has its lower end projecting the precise distance beyond the electrodes 57 and 63. When the arm 47 is swung downwardly upon the pivot 46, as explained, the head 45 turns the operating arm 65 upon its pivot 66, due to the pulling action of the bolt 68 against the spring 69, and the electrodes 57 and 63 have a firm yielding contact with the wire while it is clamped by the jaw 42. When the pin 76 reaches the point 76', the slide 13 has reached its lowermost position, which is defined by the slide 13 contacting with a vertically adjustable stop 82, in the form of a bolt tapped into a stud 83, rigidly secured to the plate 10. The stop 82 engages the shoulder 82' provided by a groove 83' in the slide. The downward movement of the slide may thus be arrested, while the disc 74 continues to rotate, because the spring 79 will now be compressed and will permit of the further turning movement of the disc until the pin 76 reaches a point 77' and also passes beyond this point. While the pin 76 is traveling between the points 76' and 77', the slide 13 is in the lowermost position and there is a dwell so that the slide remains stationary, and during this dwell, the companion part to be welded to the wire is brought into engagement with the lower end of the wire while the wire remains stationary and the welding is effected, as will be described. When the slide 13 moves downwardly, the rollers 26 and 32 traveling in the cam grooves 27 and 33 shift the blades 23 and 24 outwardly from the wire.

A cam 84 is rigidly mounted upon the disc 74 at its periphery, and is spaced from the pin 76 for about 150 degrees and this cam is arranged to engage a roller 85 carried by a bell crank lever 86 and this bell crank lever is pivoted upon the plate 10 by a pin 87. At its lower end, the bell crank lever 86 has a head 88 arranged to contact with the cam bar 34, adjacent to the upper end of the cam bar. It is thus seen that when the slide approaches the uppermost position, as the pin 76 approaches such uppermost position, the rollers 26 and 32 traveling in the cam slots 27 and 33 will move the blades 23 and 24 inwardly, and the blade 23 will contact with the wire at about the time that the pin reaches the high point. The blade 24 moves inwardly as the pin 76 approaches the high point but is spaced from the wire, but when the high point of the pin 76 is reached, the cam 84 will positively swing the bell crank lever 86 upon its pivot, and an additional stroke will be imparted to the blade 24, causing the blade 24 to coact with the blade 23 to sever the wire, and this occurs only when the pin has reached the high point. It is thus seen that the wire cutting means and the wire clamping means travel together with the slide 13, and when the cutting means is actuated to sever the wire, the distance between the free end of the wire and the electrodes remains permanently constant. Upon the upward movement of the pin 76, the bolt 80 contacts with the block 78 and the arm 47 is swung upwardly, releasing the pressure of the electrodes upon the wire and also releasing the clamping action of the jaw with the wire, so that the wire remains stationary while the slide is moving upwardly and the wire is severed when the slide reaches the high point, as explained.

The numeral 89 designates a vertical bracket rigidly mounted upon the foot 11, and a horizontal arm 90 is pivoted to this bracket, as shown at 91. This arm carries a depending block 92, having a horizontal tubular arm 93 rigidly secured thereto. The arm 93 is thoroughly electrically insulated from the block 92 by an insulating sleeve 92' and insulating washer 93'. The arm 93 operates within an opening 94' in the plate 10 and this opening is sufficiently large so that the arm never contacts with the plate 10 and is accordingly electrically insulated therefrom. The tubular arm 93 receives a substantially horizontal shaft 94, rigidly held therein, having a vertical head 95 rigidly secured thereto. The head 95 is provided with a vertical opening for receiving a shaft 96, clamped therein, carrying a head 97. This head has a pair of grooves in its top for receiving and holding an inverted U-shaped metallic part 98, which may be formed of non-ferrous material, to be welded to the lower end of the wire. The part 98 may be applied to the head 97 manually or by any other suitable means and a forked holding element 98' is suitably supported above the part 98 to permit of the passage of the wire, and to hold the part 98 against upward movement. This forked holding element may be held stationary by any suitable means, until the welding has been completed and the wire severed, after which the fork is removed from over the part 98, and the completed product is removed from the machine. Any suitable means may be employed to hold the part 98 stationary while the slide 13 is moved upwardly. Arranged above the arm 90 is a horizontal lever 99, pivoted upon the pin 91, and having a horizontal leaf spring 100 secured thereto, and having a part 101 mounted thereon for adjustment longitudinally of the leaf spring. The part 101 may be shifted toward and from the free end of the leaf spring 100, and the free end of this leaf spring is arranged to engage a bolt 102, which is tapped into the arm 90, as shown. The depending portion 92 is retracted by a spring 102' connected therewith. The pivoted arrangement for holding the part 98 is quite similar to the pivoted electrode holder arrangement shown in Patent No. 2,578,835, issued to A. F. Pityo et al., December 18, 1951.

Pivotally connected with the free end of the lever 99 at 103 is a link 104, having a cam strap 105 at its upper end, engaging a cam 106 mounted upon the shaft 72. The parts are so timed in operation that when the carriage is at the low point and during the dwell of the carriage, occurring while the pin 76 is travelling between the points 76' and 77' the cam 106 will swing the lever 99 downwardly and this lever will swing the arm 90 upon its pivot to raise the holder 97, bringing the part or work 98 into contact with the lower end of the then stationary wire. The holder 97 is raised as soon as the pin 76 reaches the point 76' and is retained in the raised position until the pin 76 travels beyond the point 77'. The holder 97 is yieldingly raised by the action of the leaf spring 109 and this spring provides suitable pressure between the part 98 and the wire, and this pressure automatically follows through during the welding time, and the welding occurs during the dwell of the slide 13 at the lowermost position, as explained.

Figure 16:
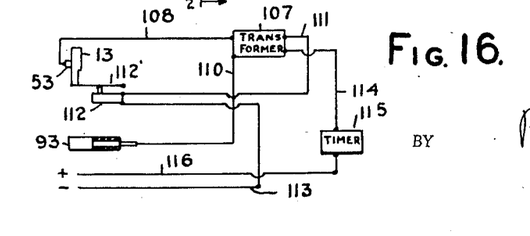

In Figure 3a I have shown a welding circuit. In this figure the numeral 107 designates a transformer. A wire 108 is connected with one terminal of the secondary winding of the transformer and is connected with the bolt 53, and hence is electrically connected with the electrodes 57 and 63 and the wire 36. The opposite terminal of the secondary winding is connected with a wire 110, electrically connected with the end of the tubular arm 93, and hence electrically connected with the holder 97 and part or work 98. The tubular arm 93 is thoroughly insulated from the support 10 and hence thoroughly insulated from wire 36. One terminal of the primary winding of the transformer 107 is connected with a wire 111, having a switch 112 connected therein and the wire 111 is connected with a lead wire 113. A wire 114 is connected with the opposite terminal of the primary winding of the transformer and has a timing switch 115 connected therein. The wire 114 is connected with a lead wire 113. The circuit arrangement is substantially the same as shown in Figure 9 of Patent 2,578,835.

The operation of the apparatus is as follows: The disc 74 is turned continuously clockwise, Figure 1, and the pin 76 has travelled to the uppermost position, Figures 1 and 8, and the slide 13 is at the top position. The wire 36 has its lower end welded to the part 98, and hence the wire remains stationary during the upward travel of the slide 13. As soon as the pin 76 passes the uppermost position and travels slightly beyond such uppermost position, it moves the link 75 downwardly and the arm 47 is swung downwardly upon its pivot 46, and the jaw 42 grips the wire against the block 38, so that the wire must travel with the jaw. By the time that the pin 76 reaches and immediately passes its high point, the cam 84 engages the roller 85, which occurs immediately after the jaw 42 gripping the wire 36, and the bell crank lever 86 is swung upon its pivot 87, and swings the upper end of the cam bar 34 inwardly, which in turn shifts the blade 24 inwardly so that the blades sever the wire, at a fixed point spaced from the electrodes 57 and 63. It is frequently critical that the length of the wire 36 projecting beyond the electrodes remain constant so that the resistance of the projecting portion of the wire will not vary, and this length remains constant since the blades and electrodes are both mounted upon the slide 13 to travel therewith. The blades 34 are moved toward each other by the action of the rollers 26 and 32 as a slide moves upwardly, but an additional stroke is imparted to the blade 24, by swinging the cam track 34 inwardly, as explained.

When the pin 76 reaches the high point and starts upon its downward travel, arm 47 is turned upon its pivot 46 so that jaw 42 will positively grip the wire 36, as explained and the bolt 70 will act upon the spring 69 which will cause the operating arm 65 to swing the electrode 63 inwardly, so that the wire has firm contact with the electrodes 57 and 63, during the welding period. As the pin 76 continues to travel downwardly, the link 75 will move the slide 13 downwardly through the medium of the arm 47 and the associated elements. When the slide 13 reaches the lowermost position it is stopped by the stationary stop 82 contacting the shoulder 82' of the slide 13, Figure 2. When this occurs, the pin 76 has reached substantially the point 76', and the continued turning movement of the disk 74 will compress the spring 79 as the link 75 continues to move downwardly slightly. This compression of the spring 79 continues until the pin 76 passes the lowermost position. While the pin 76 is travelling between the points 76' and 77', the slide 13 is held stationary at the lowermost position, and during this dwell the welding circuit is closed. As soon as the dwell starts, the switch 112 is closed, which may be effected by any suitable automatic means or manually. The primary side of the welding circuit is therefore closed, and remains closed for a suitable length of time and is automatically opened by the timer 115. The circuit including the secondary side of the transformer is now closed, since the cam arrangement is so timed that the tubular arm 93 is swung upwardly, when the pin 76 reaches point 76', and the welding current is supplied to the contacting parts 36 and 98, during the dwell of the slide 13 at the lowermost position. The welding circuit is open by the action of the timer 115. The lower end of the wire is therefore welded to the part 98. The switch 112 may be closed by a spring or finger 112', arranged in the path of travel of the slide 13 or a part carried by the slide so that the welding circuit will be closed when the pin 76 reaches the point 76', and the dwell of the slide starts, the slide being then in the lowermost position. The timer 115 opens the welding circuit at the completion of the welding period. When the pin 76 travels upwardly, the jaw 42 releases the wire 36, and the electrode 63 releases the wire 36, so that the wire remains stationary after being welded to the part 98, while the slide 13 travels to the upper position. When the pin 76 reaches the top position and starts upon its down travel, the wire is again clamped by the jaw 42, and the blades sever the wire. The previously formed article including the severed wire and the attached part 98 are removed, and a new part 98 placed upon the holder 97, while the slide is moving downwardly, so that the cycle of operation may be repeated.

It is thus seen that means is provided to securely grip the wire while it is engaged by the electrode means and to cause the wire to extend beyond the electrode means for a precise length. The wire is then brought into contact with the companion metal part to butt weld the end of the wire to such part. The length of the wire extending beyond the electrode means is critical under certain circumstances, particularly when welding non-ferrous metals. The machine also provides means to positively stop the down stroke of the slide and wire at the lowermost position and to provide a dwell, and during this dwell, the companion metal part is brought into contact with the wire by shifting such metal part. The advantage in bringing the companion metal part into contact with the free end of the stationary wire is to avoid bending of the parts, which might occur if the contact was effected by the downward movement of the wire at high speed, due to inertia and further because it is difficult to regulate the precise stroke of the wire holding means. Further, if the wire would have a hammering action against the companion metal part, the wire holding means must then have a powerful gripping action with the wire to prevent slippage, and this powerful gripping action might deform or injure the wire, or vary its resistance.

All parts of the apparatus which are not specified as formed of insulating material, are formed of metal.

It is to be understood that the form of my invention herewith shown and described is to be taken as a preferred example of the same and that various changes in the shape, size and arrangement of parts, may be resorted to, without departing from the spirit of my invention or the scope of the subjoined claims.

Having thus described my invention, I claim:

1. A machine for welding wire or the like to a metal part, a support, a carriage mounted to reciprocate upon the support, wire gripping means mounted upon the carriage to move therewith and hold the wire so that its longitudinal axis extends longitudinally of the direction of movement of the carriage, electrode means mounted upon the carriage to move therewith and to contact with the wire, wire severing means mounted upon the carriage to move therewith and arranged in advance of and spaced from the electrode means, the distance between the electrode means and wire severing means being fixed so that the length of that portion of the wire extending forwardly beyond the electrode means will remain constant when the wire is severed, means to reciprocate the carriage, means for holding the metal part in alignment with the forward end of the wire, and means for connecting the electrode means with one pole of a source of current and the metal part with the opposite pole of the source of current.

2. A machine for welding wire or the like to a metal part, comprising, a support, a carriage mounted to reciprocate upon the support, wire gripping means mounted upon the carriage to move therewith and hold the wire so that its longitudinal axis extends longitudinally of the direction of movement of the carriage, electrode means mounted upon the carriage to move therewith and to contact with the wire, wire severing means mounted upon the carriage to move therewith and arranged in advance of and spaced from the electrode means, the distance between the electrode means and the wire severing means remaining fixed so that the length of that portion of the wire extending forwardly beyond the electrode means will remain constant when the wire is severed, means to reciprocate the carriage and to cause a dwell of the carriage at the end of the forward stroke of the carriage, means for holding the metal part in advance of the electrode means and moving the metal part longitudinally of the wire and toward the free end of the wire to bring the metal part into contact with the free end of the wire during the dwell of the carriage, and means to connect the electrode means with one pole of a source of current and the metal part with the opposite pole of such source of current.

3. A machine for welding wire or the like to a metal part comprising, a support, a carriage mounted to reciprocate upon the support, wire gripping means mounted upon the carriage to move therewith and hold the wire so that its longitudinal axis extends longitudinally of the direction of the movement of the carriage, electrode means mounted upon the carriage to move therewith and to contact with the wire, wire severing means mounted upon the carriage to move therewith and arranged in advance of and spaced from the electrode means, the distance between the electrode means and the wire severing means remaining fixed so that the length of that portion of the wire extending forwardly beyond the electrode means will remain constant when the wire is severed, means to operate the wire gripping means and also serving to reciprocate the carriage and to cause a dwell of the carriage at the end of the forward stroke of the carriage, means for holding the metal part in advance of the electrode means and moving the metal part longitudinally of the wire and toward the free end of the wire to bring the metal part into contact with the free end of the wire during the dwell of the carriage, and means to connect the electrode means with one pole of a source of current and the metal part with the opposite pole of the source of current.

4. A machine for welding wire or the like to a metal part comprising, a support, a carriage mounted to reciprocate upon the support, wire gripping means mounted upon the carriage to move therewith and hold the wire so that its longitudinal axis extends longitudinally of the direction of movement of the carriage, said wire gripping means including a movable element, electrode means mounted upon the carriage to move therewith and to contact with the wire, said electrode means including a second movable element, wire severing means mounted upon the carriage to move therewith and arranged in advance of and spaced from the electrode means, the distance between the electrode means and the wire severing means remaining fixed so that the length of that portion of the wire extending forwardly beyond the electrode means will remain constant when the wire is severed, driving means connected with the first-named element and including a yielding device, means operated by the first-named element to move the second named element, stop means arranged in the path of travel of the carriage to cause a dwell of the carriage at the end of the forward stroke of the carriage, means for holding the metal part in advance of the electrode means and in alignment with the free end of the wire, and means to connect the electrode means with one pole of a source of current and the metal part with the opposite pole of the source of current.

5. A machine for welding wire or the like to a metal part comprising, a support, a carriage mounted to reciprocate upon the support, wire gripping means mounted upon the carriage to move therewith and hold the wire so that its longitudinal axis extends longitudinally of the direction of movement of the carriage, said wire gripping means including a pivoted element, electrode means mounted upon the carriage to move therewith and to contact with the wire, said electrode means including a second movable element, wire severing means mounted upon the carriage to move therewith and arranged in advance of and spaced from the electrode means, the distance between the electrode means and the wire severing means remaining fixed so that the length of that portion of the wire extending forwardly beyond the electrode means will remain constant when the wire is severed, driving means connected with the first-named pivoted element and including a yielding device, means operated by the first-named pivoted element to move the second-named pivoted element, stop means arranged in the path of travel of the carriage to cause a dwell of the carriage at the end of the forward stroke of the carriage, means for holding the metal part in advance of the electrode means and in alignment with the free end of the wire, and means to connect the electrode means with one pole of a source of current and the metal part with the opposite pole of the source of current.

6. A machine for welding wire or the like to a metal part comprising, a support, a carriage mounted to reciprocate upon the support, wire gripping means mounted upon the carriage to move therewith and hold the wire so that its longitudinal axis extends longitudinally of the direction of movement of the carriage, electrode means mounted upon the carriage to move therewith and to contact with the wire, wire severing means mounted upon the carriage to move therewith and arranged in advance of and spaced from the electrode means, the distance between the electrode means and the wire severing means remaining fixed so that the length of that portion of the wire extending forwardly beyond the electrode means will remain constant when the wire is severed, cam elements mounted upon the support and extending longitudinally of the direction of the movement of the carriage, elements connected with the wire severing means and engaging the cam elements, means to hold the metal part in advance of the electrode means and in alignment with the free end of the wire to cause the metal part to contact with such free end, and means to connect the electrode means with one pole of a source of current and the metal part with the opposite pole of such source of current.

7. A machine for welding wire or the like to a metal part comprising, a support, a carriage mounted to reciprocate upon the support, wire gripping means mounted upon the carriage to move therewith and hold the wire so that its longitudinal axis extends longitudinally of the direction of movement of the carriage, electrode means mounted upon the carriage to move therewith and to contact with the wire, wire severing means mounted upon the carriage to move therewith and arranged in advance of and spaced from the electrode means, the distance between the electrode means and the wire severing means remaining fixed so that the length of that portion of the wire extending forwardly beyond the electrode means will remain constant when the wire is severed, said wire severing means including reciprocatory devices, cam bars mounted upon the support and extending longitudinally of the direction of movement of the carriage, elements secured to the reciprocatory devices and engaging the cam bars, means arranged in advance of the electrode means for holding said metal part, and means for connecting the electrode means with one pole of a source of current and the metal part with the opposite pole of such source of current.

8. A machine for welding wire or the like to a metal part comprising, a support, a carriage mounted to reciprocate upon the support, wire gripping means mounted upon the carriage to move therewith and hold the wire so that its longitudinal axis extends longitudinally of the direction of movement of the carriage, electrode means mounted upon the carriage to move therewith and to contact with the wire, wire severing means mounted upon the carriage to move therewith and arranged in advance of and spaced from the electrode means, the distance between the electrode means and the wire severing means remaining fixed so that the length of that portion of the wire extending forwardly beyond the electrode means will remain constant when the wire is severed, said wire severing means including reciprocatory devices, a cam bar to be mounted stationary upon the support and extending longitudinally of the direction of movement of the carriage and having a longitudinal cam face, an element secured to one device and engaging the cam face, a second cam bar pivotally mounted upon the support and extending longitudinally of the direction of movement of the carriage and provided with a longitudinal cam face, an element secured to the other device and engaging the cam face of the second cam bar, means to move the pivoted cam bar, means to reciprocate the carriage, means to arrange in advance of the electrode means for holding the metal part, and means for connecting the electrode means with one pole of a source of current and the metal part with the opposite pole of such source of current.

9. A machine for welding wire or the like to a metal part comprising, a support, a carriage mounted to reciprocate upon the support, wire gripping means mounted upon the carriage to move therewith and hold the wire so that its longitudinal axis extends longitudinally of the direction of movement of the carriage, said wire gripping means including a pivoted member, electrode means mounted upon the carriage to move therewith and to contact with the wire, wire severing means mounted upon the carriage to move therewith and arranged in advance of and spaced from the electrode means, the distance between the electrode means and the wire severing means remaining fixed so that the length of that portion of the wire extending forwardly beyond the electrode means will remain constant when the wire is severed, a rotary element, a link pivotally connected with the rotary element, means connecting the link and the pivoted member including a yielding device, a stop element arranged in the path of travel of the carriage to limit its movement at the end of its forward stroke, means arranged in advance of the electrode means for holding the metal part and moving the same into contact with the free end of the wire, and means for connecting the electrode means with one pole of a source of current and the metal part with the opposite pole of such source of current.

10. A machine for welding wire or the like to a metal part comprising, a support, a carriage mounted to reciprocate upon the support, a clamp block mounted upon the carriage to move therewith, an arm pivotally mounted upon the carriage to move therewith and arranged opposite the clamp block, a jaw carried by the arm to grip the wire against the clamp block, wire guide means mounted upon the carriage in advance of the clamp block, the wire guide means holding the wire so that its longitudinal axis extends longitudinally of the direction of movement of the carriage, a movable electrode mounted upon the wire guide means to move therewith, means operated by the pivoted arm to operate the movable electrode, wire severing means mounted upon the carriage to move therewith and arranged in advance of and spaced from the movable electrode, the distance between the movable electrode and the wire severing means remaining fixed so that the length of that portion of the wire extending forwardly beyond the movable electrode will remain constant when the wire is severed, a rotary element, a link pivotally connected with the rotary element and connected with the pivoted arm, means for holding the metal part for contact with the free end of the wire, and means for connecting the movable electrode with one pole of a source of current and the metal part with the opposite pole of such source of current.

11. A machine for welding wire or the like to a metal part comprising, a support, a carriage mounted to reciprocate upon the support, wire gripping means mounted upon the carriage to move therewith and hold the wire so that its longitudinal axis extends longitudinally of the direction of movement of the carriage, said wire gripping means including a pivoted arm, electrode means mounted upon the carriage in advance of the wire gripping means to move with the carriage and to contact with the wire, said electrode means including a pivoted electrode, an operating arm pivotally mounted upon the first-named pivoted arm and engaging the pivoted electrode, yielding means connecting the wire gripping means and the second-named pivoted arm at a point spaced from its pivot, wire severing means mounted upon the carriage to move therewith and arranged in advance of and spaced from the electrode means, the distance between the electrode means and the wire severing means remaining fixed so that the length of that portion of the wire extending forwardly beyond the electrode means will remain constant when the wire is severed, driving means connected with the first named arm to bodily reciprocate it, means for holding the metal part for contact with the free end of the wire, and means for connecting the electrode means with one pole of a source of current and the metal part with the opposite pole of the source of current.

12. A machine for welding wire or the like to a metal part comprising, a support, a carriage mounted to reciprocate upon the support, wire gripping means mounted upon the carriage to move therewith and hold the wire so that its longitudinal axis extends longitudinally of the direction of movement of the carriage, said wire gripping means including a pivoted member, electrode means mounted upon the carriage to move with the carriage and contact with the wire, wire severing means mounted upon the carriage to move therewith and arranged in advance of and spaced from the electrode means, the distance between the electrode means and the wire severing means remaining fixed so that the length of that portion of the wire extending forwardly beyond the electrode means will remain constant when the wire is severed, a rotary member, a link pivotally connected with the rotary member, yielding connecting means between the link and the pivoted member, a stop element arranged in the path of travel of the carriage to limit its stroke in a forward direction, a lever to operate the severing means and pivoted upon the support, and a cam carried by the rotary element and arranged to operate the lever, means to hold the metal part to contact with the free end of the wire, and means for connecting the electrode means with one pole of a source of current and the metal part with the opposite pole of the source of current.

13. A machine for welding wire or the like to a metal part comprising, a support, a carriage to reciprocate upon the support, wire gripping means mounted upon the carriage to move therewith and hold the wire so that its longitudinal axis extends longitudinally of the direction of movement of the carriage, electrode means mounted upon the carriage to move therewith and to contact with the wire, wire severing means mounted upon the carriage to move therewith and arranged in advance of and spaced from the electrode means, the distance between the electrode means and the wire severing means remaining fixed so that the length of that portion of the wire extending forwardly beyond the electrode means will remain constant when the wire is severed, a rotary element, yielding driving connecting means between the rotary element and the wire gripping means, and serving to reciprocate the carriage, a stop device arranged in the path of travel of the carriage to limit its movement at the end of its forward stroke, a movable device for holding the metal part in alignment with the free end of the wire, and means timed with respect to the rotary element to move the movable device and the metal part into contact with the free end of the wire when the carriage is at the end of its forward stroke.

14. A machine for welding wire or the like to a metal part comprising, a support, a carriage to reciprocate upon the support, wire gripping means mounted upon the carriage to move therewith and hold the wire so that its longitudinal axis extends longitudinally of the direction of movement of the carriage, electrode means mounted upon the carriage to move therewith and to contact with the wire, wire severing means mounted upon the carriage to move therewith and arranged in advance of and spaced from the electrode means, the distance between the electrode means and the wire severing means remaining fixed so that the length of that portion of the wire extending forwardly beyond the electrode means will remain constant when the wire is severed, a device for holding the metal part and arranged in advance of the electrode means, means to reciprocate the carriage and cause a dwell of the carriage at the end of its forward stroke, and resilient means for moving the holding device toward the carriage and in a direction longitudinally of the movement of the carriage to cause the metal part to contact with the free end of the wire and to follow through during the welding period, and means for connecting the electrode means with one pole of a source of current and the metal part with the opposite pole of such source of current.

15. A machine for welding wire or the like to a metal part comprising, a support, a carriage to reciprocate upon the support, wire holding means mounted upon the carriage to move therewith and to hold the wire so that its longitudinal axis extends longitudinally of the direction of the movement of the carriage, said wire holding means including a device to grip and release the wire, wire severing means mounted upon the carriage to move therewith and arranged in advance of the wire holding means, the distance between the wire holding means and the wire severing means remaining fixed so that the length of that portion of wire extending forwardly beyond the wire holding means will remain constant when the wire is severed, means to reciprocate the carriage, means to operate the device to grip the wire when the carriage starts upon its forward stroke and to release the wire when the carriage starts upon its rear stroke, means to operate the wire severing means to sever the wire when the carriage moves upon its forward stroke and the device grips the wire, a holding device for the metal part and arranged near and in advance of the wire holding means when the carriage is adjacent to the end of its forward stroke, and means timed in operation with respect to the movement of the carriage to move the holding device to bring the metal part into contact with the free end of the wire when the carriage is adjacent to the end of its forward stroke, and means for connecting the wire holding means with one pole of a source of current and the metal part holding device with the opposite pole of the source of current.

ALBERT F. PITYO.

References Cited in the file of this patent

UNITED STATES PATENTS

| Number | Name | Date |
|---|---|---|
| 2,308,658 | Jendresen | Jan. 19, 1943 |
| 2,316,597 | Kershaw | Apr. 13, 1943 |
| 2,473,543 | Randolph | June 21, 1949 |